W. A. GIBBS.
ANIMAL TRAP.
APPLICATION FILED MAY 25, 1915.
1,186,569.
Patented June 13, 1916.
2 SHEETS—SHEET 1.
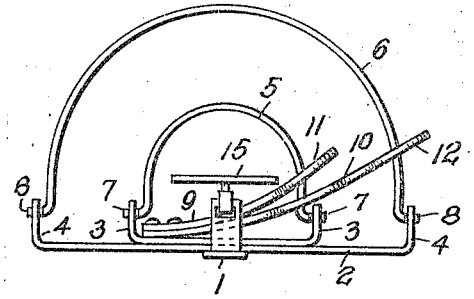
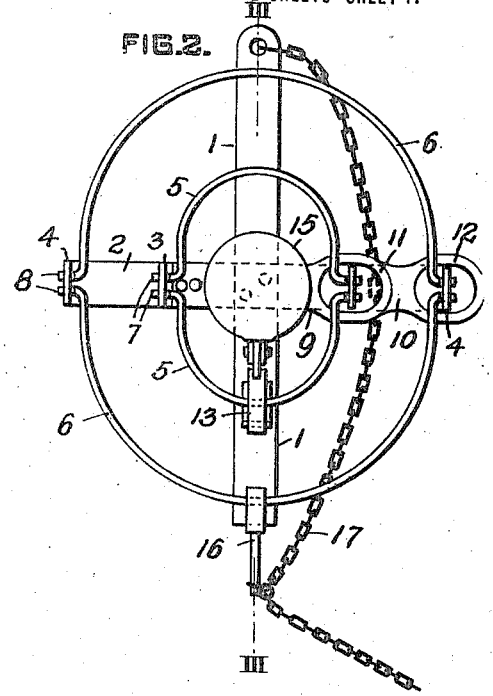
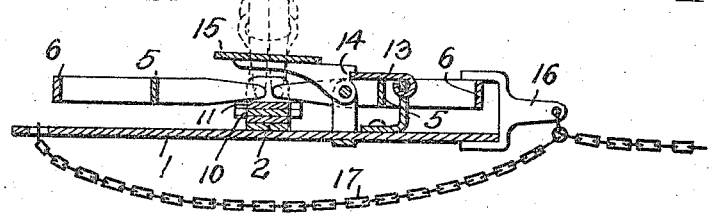
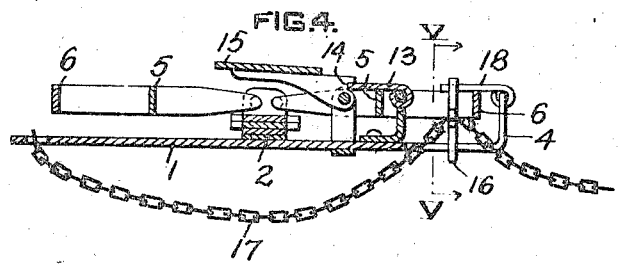
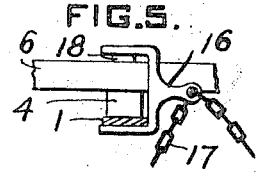
WITNESSES
J. Herbert Bradley
INVENTOR
Walter A. Gibbs
by Damon & Wolcott
Atty.

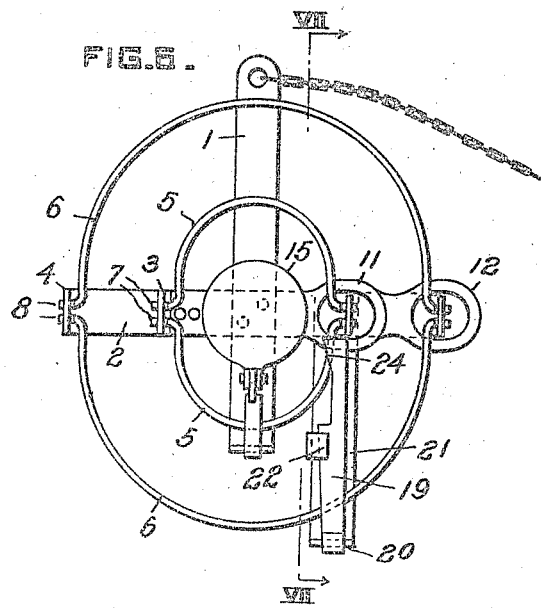
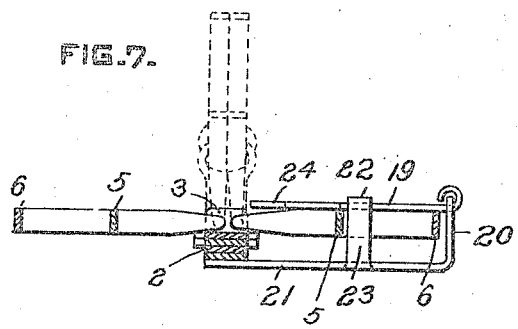

UNITED STATES PATENT OFFICE.

WALTER A. GIBBS, OF CHURCH CREEK, MARYLAND.

ANIMAL-TRAP.

1,186,569.

Specification of Letters Patent.

Patented June 13, 1916.

Application filed May 25, 1915. Serial No. 30,384.

*To all whom it may concern:*

Be it known that I, WALTER A. GIBBS, residing at Church Creek, in the county of Dorchester and State of Maryland, a citizen of the United States, have invented or discovered certain new and useful Improvements in Animal-Traps, of which improvements the following is a specification.

In the accompanying drawing forming a part of this specification, Figure 1 is a side elevation of an animal trap in closed position embodying my improvement; Fig. 2 is a top plan view of the trap in open or "set" position; Fig. 3 is a sectional view on a plane indicated by the line III—III Fig. 2; Fig. 4 is a view similar to Fig. 3 illustrating a modification of the trigger arrangement for the outer jaws; Fig. 5 is a sectional view on a plane indicated by the line V—V Fig. 4; Fig. 6 is a top plan view of a trap in open or "set" position illustrating a modification of the latch mechanism for the outer or auxiliary jaws, and Fig. 7 is a sectional view on a plane indicated by the line VII—VII Fig. 6.

The invention described herein has for its object a construction of trap embodying two pairs of jaws, the second or auxiliary pair of jaws being adapted to be released subsequent to the release of the first or main pair, such release being effected by the movement of one of the main jaws or by the movement of the trap when shifted by the animal caught by the other pairs of jaws.

The invention is hereinafter more fully described and claimed.

In the practice of the invention, the base of the trap is preferably formed of two bars 1 and 2 arranged at right angles to each other and riveted together at their intersection as clearly shown in Figs. 2 and 3. One of these bars as 2 is provided with two pairs of upwardly projecting lugs 3 and 4, the members of each pair being arranged equidistant from the point of intersection of the base bars and the lugs 4 being located outside of the lugs 3. The distances of the lugs 3 and 4 will be dependent upon the desired diameters of the jaws desired. It is preferred that the inner lugs 3 should be formed by turning up the ends of a short bar riveted to the base bar 2. The jaws 5 and 6 are semicircular in shape as is customary in this style of trap and are provided at their ends with outwardly projecting trunnions 7 and 8 adapted to fit in holes in the lugs 3 and 4 as shown in Figs. 1 and 2.

Any suitable arrangement of springs may be employed for closing the jaws and holding them in closed position, but it is preferred to employ the construction in general use. These springs 9 and 10 consist of spring steel having one end riveted to the cross-bar 2, and the opposite or free ends formed with eyes or loops 11 and 12 inclosing the jaws. The springs are so bent that when the jaws are closed the loops will inclose the jaws some distance above their pivotal supports. As the loops 11 and 12 are made of a width only a little greater than the combined widths of the jaws, the latter can not be separated until the loops be pushed below the pivotal points of the jaws. When so pressed down and the jaws opened the sides of the eyes or loops of the spring will bear against the under edges of the jaws adjacent to pivotal points.

The inner pair of jaws 5, may be held open in set position by any suitable means such for example as that shown, consisting of swinging latch 13 so mounted as to be turned down over one of the jaws 5 and engage at its inner end a notch 14 in the pivotally mounted treadle 15. This treadle is so located as to be surrounded by the jaws 5 when open, and the jaws when released will meet above the treadle, so as to grip the foot or other part of the animal contacting with the treadle.

It not infrequently happens when using a trap having a single pair of jaws that the animal will jerk back its foot as it feels the treadle yield and the jaws will not securely grip the animal, and the animal in its struggles will release itself. In order to prevent the escape of the animal, provision is made for the release of the outer or auxiliary pair of jaws before the animal can effect a release from the first or main jaws. The release of the catch mechanism of the auxiliary jaws can be effected either by the movement of the trap by the animal in its struggles or by one of the main jaws as it moves to closed position. In the embodiment of my improvement shown in Figs. 1, 2 and 3, a catch employed for holding the jaws 6 in open position is connected by a chain or other suitable means to an anchor, so that when the trap is shifted, the catch will be disengaged from the jaws permitting them to close. A suitable construction to this end consists of a fork 16 so constructed that when placed in operative relation one prong will extend over one of the jaws, while the other prong extends under the base bar 1 of the trap as shown in Figs. 2 and 3. This fork is connected to a chain 17 preferably the chain usually employed for preventing the trap being carried away by the animal. As the chain is attached when the trap is set to a tree, drag or other anchor, the movement of the trap by the animal will disengage the fork from the jaw. In lieu of the fork directly engaging one of the jaws 6 a swinging latch 18 may be so mounted as to be capable of being turned over one of the jaws 6, and to be held in such position by one of the prongs of the fork, the other prong engaging the base bar as shown in Figs. 4 and 5.

In Figs. 6 and 7 is shown an embodiment of the invention wherein the release of the auxiliary jaws is due to a movement of a portion of the trap. The main and auxiliary jaws are preferably arranged as shown in Figs. 1 to 5 and are adapted to be shifted to and held in closed position by springs 9 and 10 as hereinbefore described. The inner or main jaws are held in open or "set" position by a latch 13 and treadle 14 or by any other suitable construction. The latch 19 is pivotally mounted on lugs 20 preferably formed by turning up the end of a bar 21 secured to the base bar 2. The bar 21 and the latch are so arranged that when the latter is turned down over one of the jaws when opened and locked in such position, a portion of the latch will project into the path of movement of one of the inner jaws, whereby the latch will be released as the jaw 5 closes thereby permitting of the closing of the auxiliary jaws. In the construction shown, the latch is so pivoted that in addition to its movement over the jaw 6, it may be moved laterally so that a portion thereof will pass under a shoulder 22 on a finger 23 carried by the bar 21. The inner end of the latch is provided with a lateral projection 24 which will extend over one of the jaws 5 when open as shown in Fig. 6. The edge of this projection is preferably beveled where engaged by the jaw 5 in the closing movement of the latter so that the latch can be easily shifted out of engagement with the shoulder 22, thus permitting of the closing of the jaws 6.

I claim herein as my invention:

1. A trap having in combination, a pair of spring actuated jaws, means for holding said jaws in open position and adapted to be shifted to release the jaws by the foot or other part of an animal, an auxiliary pair of spring actuated jaws, means for holding said auxiliary jaws in open position until after the release of the main jaws, and means for releasing the auxiliary jaws.

2. A trap having in combination, a pair of spring actuated jaws, means for holding said jaws in open position and adapted to be shifted to release the jaws by the foot or other part of an animal, an auxiliary pair of spring actuated jaws, means for holding said auxiliary jaws in open position until after the release of the main jaws, and adapted to be shifted to release the auxiliary jaws by a movement of a portion of the trap.

3. A trap having in combination, a pair of spring actuated jaws, means for holding said jaws in open position and adapted to be shifted to release the jaws by the foot or other part of an animal, a pair of spring actuated auxiliary jaws, and means for holding said auxiliary jaws in open position until after the release of the main jaws and adapted to be shifted to release the jaws when the trap is shifted.

4. A trap having in combination, a pair of spring actuated jaws, means for holding said jaws in open position and adapted to be shifted to release the jaws by the foot or other part of an animal, a second pair of spring actuated jaws, means movable relative to the trap for holding said jaws in open position, and means for preventing the jaw holding means from movement with the trap.

In testimony whereof I have hereunto set my hand.

WALTER A. GIBBS.

Witnesses:
J. RICHARD JONES,
CLARA SAUERHOFF.